Aug. 20, 1968 W. EGGE 3,397,455
CITRUS FRUIT PEELER
Filed Oct. 24, 1966
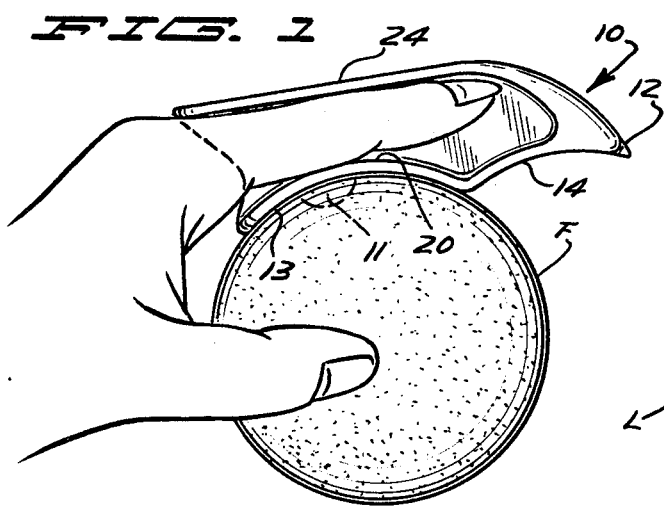
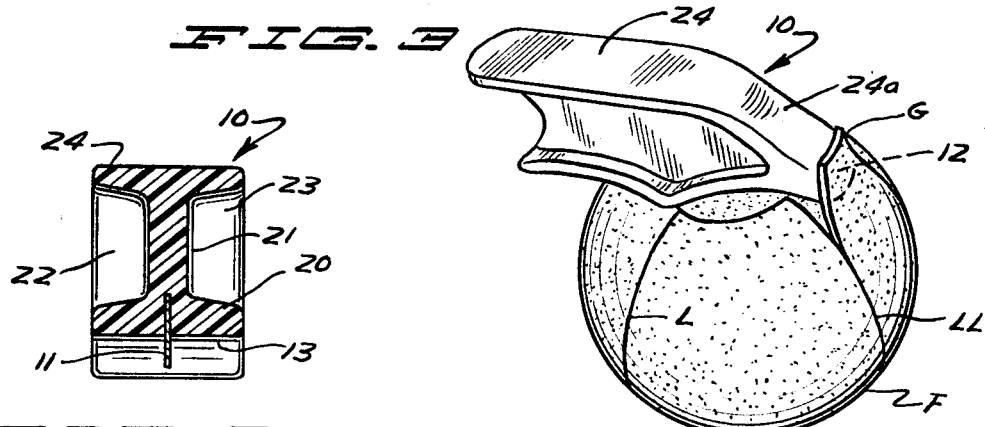
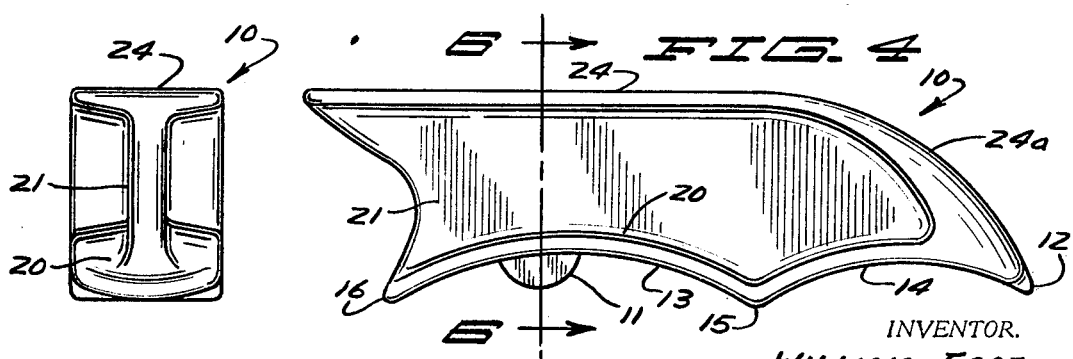
INVENTOR.
WILLIAM EGGE
BY
Adams Cusayna & Haugen
ATTORNEYS

United States Patent Office 3,397,455
Patented Aug. 20, 1968

3,397,455
CITRUS FRUIT PEELER
William Egge, Box 27, Heron Lake, Minn. 56137
Filed Oct. 24, 1966, Ser. No. 589,093
7 Claims. (Cl. 30—24)

ABSTRACT OF THE DISCLOSURE

This invention relates to a device for peeling citrus fruits which provides a first cutting section providing a cutting element therein which section is arcuately shaped to provide a guiding surface for contacting the skin of the fruit while the cutting element is actually penetrating and cutting the skin of the fruit and a second skin removing element arranged in spaced relation to the cutting section which provides a second arcuate portion designed to guard against the surface of the fruit itself with a tapered end on one end thereof, which end is inserted between the fruit and the inner side of the skin such that as the fruit is rotated therepast the tapered end will serve to force the skin from the fruit.

---

In the past various unsuccessful food and fruit peelers have been designed for removing the skin from citrus fruits. Many of these devices have incorporated concepts which include scraping the unwanted skin from the meat or have included complicated mechanisms for removing the skin from the fruit in substantially larger portions. These items of course are well known but up until now none of these items have proven particularly successful in peeling citrus fruits due to various reasons such as inability to adjust cutting depth for skin thickness and damaging of the fruit meat through squeezing or other such mutilations.

Through the device disclosed in this application applicant provides a new and unique fruit peeler device for removing the skin from citrus fruits which include lemons, limes, oranges and grapefruits. The particular construction utilized by applicant permits the skin of the fruit to be removed in substantially large sections which also reduces the normal peeling time involved.

The device disclosed and claimed herein is also designed for simple, easy operation by providing the unit to conform to the hand of the user and as such permits stable control of the unit without requiring any complicated mechanical support structure.

With the device provided herein by applicant a two step operation is utilized. The first step is to cut through and section the skin of the fruit and the second step is to remove the sections in their cut form. It is not necessary with the device provided herein that any actual finger operation be employed to tear or rend the skin from the meat. The cutting and peeling is designed such that the unit need simply be passed around the fruit to describe the cutting and section lines and thereafter a portion of the unit is utilized to peel the skin directly from the meat. In this manner it should be obvious that a simple clean operation is accomplished without the normally encountered juice, squirting from the fruit.

It is therefore an object of applicant's invention to provide a new and unique citrus fruit peeler device which is designed to conform to the shape of an individual's hand to provide certain ease in grasping thereof and which is designed to simply and effectively remove the outer skin from citrus fruits.

It is a further object of applicant's invention to provide a new and unique fruit peeling device which includes a cutting portion for describing and cutting the skin of the citrus fruit into certain sections for their removal.

It is a further object of applicant's invention to provide a citrus fruit peeler having a portion thereof defined to coincide with the general curvature of the encountered meat such that the skin removal portion thereof may be inserted between the skin and the meat portion of the fruit to separate the two elements.

It is still a further object of applicant's invention to provide a new and unique fruit peeler which is easily and controllably manipulated to cut and slice through only the outer skin of the citrus fruit being peeled without cutting into the meat portion thereof.

These and other objects and advantages of my invention will more fully appear from the following description made in connection with the accompanying drawings, wherein like reference characters refer to the same or similar parts through the several views, and in which:

FIG. 1 is a view illustrating the use of a citrus fruit peeler embodying the concepts of applicant's invention shown in the first step of removing the skin from citrus fruit;

FIG. 2 illustrates the citrus fruit completely cut and having a top center portion thereof removed;

FIG. 3 is a view showing the utilization of the skin remover of the device;

FIG. 4 is a side elevation of the peeler;

FIG. 5 is a rear elevation taken from FIG. 4; and

FIG. 6 is a transverse section taken substantially along line 6—6 of FIG. 4.

In accordance with the accompanying drawings the fruit peeler 10 embodying the concepts of applicant's invention is shown in the first three figures of the drawings in operation to cut and remove the outer skin from a citrus fruit such as an orange or the like. In the form shown in FIG. 1 the fruit peeler is shown to be held between the index and middle finger of a person using the same.

The fruit peeler embodying the concepts of applicant's invention is particularly illustrated in FIGS. 4, 5 and 6 wherein the peeler 10 is illustrated as defining a pair of adjacently disposed and longitudinally oriented generally arcuately formed fruit contacting sections designated respectively 13–14. Section 13 in the form illustrated is of slightly greater radial curvature than the section 14 which difference is made available such that radial dimension and radial curve 13 will be slightly larger to coincide with the exterior of the citrus fruit skin while the portion 14 designed to contact the meat of the fruit is of slightly smaller radial dimension to agree with the smaller meat diameter. Then too, fruit meeting surfaces are provided, one to agree with the outside surface of the fruit to be peeled with the other to agree with the smaller inside of the fruit meat. As illustrated in FIG. 4 these two curve sections meet at a common point 15 intermediate the actual ends 12, 16 of the bottom surface of peeler 10.

In the form shown a cutting blade 11 is imbedded at a convenient point within arcuate section 13 to extend downwardly therefrom a distance which will roughly coincide with an average fruit skin thickness. It is obvious that the various fruits certainly differ in skin thickness and no particular dimension is necessary here as certain adjustments may be made by the user of the device as he encounters the various skin sizes.

The two curved sections 13–14 are in the form shown of a relatively broad transverse dimension such that a bearing surface is provided for riding over and against either the meat of the fruit or the outside skin of the fruit. This dimension is provided by utilizing a substantially I-beam configuration as illustrated in FIGS. 5 and 6 for the cross section of the device 10 and in the form shown the lower flange portion 20 of the I-beam section has the cutting blade 11 mounted substantially centrally thereof to coincide with the center of the web portion 21 of the I-beam construction. This I-beam construction then provides a pair of cavities 22–23 on the respective sides of the web 21 such that as illustrated in FIG. 1 a person may insert his index and middle finger on either side thereof to positively hold the unit in his hand.

An upper flange portion 24 overlies the web section 21 and as illustrated, the distance between the lower flange section 20 and upper flange section 24 is such that a person's fingers will conveniently fit therein. As illustrated in FIGS. 1 and 4 the uppermost flange section extends from the rearward portion of the tool 10 to a point approximately vertically coincident with the point of joinder between the curved sections 13–14. At this point the uppermost flange section 24 generally curves downwardly as shown at 24a to meet and agree with the front peel removing section 14 at the tapered front end 12 thereof. In the form shown and as best illustrated in FIG. 3 this front edge 12 is also provided with a curve on the leading edge thereof such that a point rounded in two dimensions is provided to permit the edge 12 to be easily inserted between the meat and skin. It should be obvious that the curvature of this portion 24a of the peeler 10 is designed to meet and agree with the transverse dimension of the bottom flange 20 such that the entire forward end of the tool is slightly radiused to easily and progressively force back the peel as the fruit is being rotated therepast.

As illustrated in FIGS. 4 and 5 the shape of flange 20 of the I-beam cross section coincides with the curvature of the two radiused sections 13 and 14. This of course is a weight conservation consideration and it should be obvious that this bottom flange 20 could extend parallel to the upper flange 24 while still providing the necessary room for a person's fingers between said flanges.

The device then as described provides an arcuately formed mating surface 13 to mate with the outside skin of the fruit to be peeled which surface has a downwardly extending knife edge 11 mounted therein such as the fruit is turned therepast any of the curved portion may slide along the outer surface of the fruit and thereby aid in guiding the proper depth for the cutting blade 11. As illustrated the unit also provides a second forwardly displaced curvature arrangement 14 to abut with and provide a bearing surface for the fruit meat portion which is substantially smaller in diameter than the usual outside skin portion. This skin removal portion is provided with a leading edge 12 which is easily inserted between the peel and the meat portion of the fruit such that as the fruit is rotated therepast the leading edge will force the peel progressively outwardly from the meat of the fruit.

As illustrated in FIG. 1 the fruit peeler 10 is placed into the skin of the fruit with its cutting portion 11 extending downwardly into and through the skin of the fruit F. In operation the fruit F will be rotated completely past the cutting blade such that a first line L is described entirely therearound or at least substantially therearound for a purpose to be hereinafter stated. The fruit is then rotated 90° and a second line LL is cut substantially around the fruit F. The next cutting operation is then performed at the juncture of the cut lines LL and L such that a substantially arcuate end portion E is described on one end of the fruit F. This small section E is removed in the same manner as that hereinafter described for removing the quadrants divided by the lines L and LL.

As indicated in FIG. 3, in order to remove any of the quadrants from the fruit F the peeling point 12 of the device is inserted below any one of the quadrant sections by utilizing the area provided by the removal of the small round section E and upon insertion under the leading edge G under any of the quadrants the forcing of the peeler 10 downwardly around the fruit will force the peel from the meat. This leading edge 12 is properly tapered such that a prying effect is gained.

In order to remove the skin from the fruit F it is only necessary to remove the inner cut circle E by inserting the leading edge 12 of the peeler thereunder and forcing the same across the circumference of the fruit end E. With this circle removed it is only necessary to insert the leading edge 12 under any of the quadrants and actually rotate the fruit therepast thereby easily removing the cut and defined quadrant.

It should be obvious that this particular fruit peeler then takes into consideration two basic factors in the peeling of fruit. These are the difference in the diameters of the peeled and unpeeled fruit and the ability to simply adjust the cutting edge of the device for the difference in thicknesses in the fruits encountered.

It should be obvious that applicant has provided a new and unique fruit peeler for use for peeling citrus fruit which is extremely simple in construction but which does provide an ease and positiveness of use which has heretofore not been obtained.

It will, of course, be understood that various changes may be made in the form, details, arrangements and proportion of parts without departing from the scope of my invention, which generally stated consists in the matter set forth in the appended claims.

What is claimed is:
1. A citrus fruit peeler including:
  (a) a skin cutting section having:
    (1) a generally arcuate skin contacting section; and
    (2) a cutting element arranged within said section and extending downwardly therefrom to penetrate and cut the skin;
  (b) a skin peeling section arranged adjacent one end of said arcuate section providing a second arcuate fruit meat contacting portion having a tapered skin separating edge whereby said edge will progressively separate the skin from the fruit meat as it is moved therebetween; and
  (c) hand hold means in generally overlying relation to at least said cutting section.
2. The structure set forth in claim 1 wherein the radial curvature of said meat contacting portion is less than the radial curvature of said skin contacting section.
3. The structure set forth in claim 1 and said hand hold means arranged to overlie at least a selected area of said meat contacting portion.
4. The structure set forth in claim 1 wherein said hand hold means includes at least one finger receiving area extending longitudinally along said peeler in overlying relation to at least selected portions of said skin contacting and meat contacting portions.
5. A citrus fruit peeler including:
  (a) a longitudinally extending lower flange;
  (b) said lower flange including an upstanding web element extending longitudinally therewith to provide grasping means;
  (c) said lower flange defining:
    (1) a generally arcuate longitudinally arranged skin contacting portion;
    (2) a generally arcuate, longitudinally arranged meat contacting portion located longitudinally of said skin contacting portion, the extending end thereof being tapered;
(d) a cutting element arranged in said skin contacting portion and extending radially inward; and
(e) a fruit engaging surface on both of said portions being substantially similar in any transverse plane.

6. The structure set forth in claim 5 wherein the radius of said meat contacting portion is less than the radius of said skin contacting portion.

7. The structure set forth in claim 5 and an upper flange on said web extending longitudinally there along and spaced from said lower flange a predetermined distance whereby a finger receiving area is provided therebetween.

References Cited

UNITED STATES PATENTS

| 754,191 | 3/1904 | Beil | 30—24 |
| 2,900,717 | 8/1959 | Byrd et al. | 30—24 |

FOREIGN PATENTS

| 534,494 | 9/1931 | Germany. |
| 847,188 | 6/1952 | Germany. |

WILLIAM W. DYER, JR., *Primary Examiner.*

G. WEIDENFELD, *Assistant Examiner.*